United States Patent
Krutt et al.

(10) Patent No.: US 8,509,808 B2
(45) Date of Patent: *Aug. 13, 2013

(54) MOBILE WIRELESS COMMUNICATIONS DEVICE HAVING A NEAR FIELD COMMUNICATION (NFC) DEVICE AND PROVIDING MEMORY DISABLING AND RELATED

(75) Inventors: Gereon Krutt, Wetter (DE); Maxime Matton, Waterloo (CA); Santiago Carbonell Duque, Bogota (CO)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/074,398

(22) Filed: Mar. 29, 2011

(65) Prior Publication Data

US 2012/0252480 A1    Oct. 4, 2012

(51) Int. Cl.
 *H04B 5/00* (2006.01)
 *H04W 4/00* (2009.01)
(52) U.S. Cl.
 USPC ........................................ 455/456.1; 455/41.1
(58) Field of Classification Search
 USPC ............... 455/41.2, 456.1–456.6, 127.3, 567, 455/574, 44.1, 423, 127.1, 344, 566, 418, 455/419
 See application file for complete search history.

(56) References Cited

U.S. PATENT DOCUMENTS

| | | | |
|---|---|---|---|
| 7,413,113 B1 | 8/2008 | Zhu | 235/375 |
| 7,702,282 B2 | 4/2010 | Sandegard et al. | 455/41.2 |
| 2005/0222961 A1 | 10/2005 | Staib et al. | 705/64 |
| 2006/0073819 A1 | 4/2006 | Lowles | 455/418 |
| 2006/0079180 A1 | 4/2006 | Sinivaara | 455/41.2 |
| 2006/0148404 A1 | 7/2006 | Wakim | 455/41.2 |
| 2006/0287004 A1 | 12/2006 | Fuqua | |
| 2007/0069011 A1 | 3/2007 | Barton et al. | 235/381 |
| 2007/0095892 A1 | 5/2007 | Lyons et al. | 235/379 |
| 2007/0124503 A1 | 5/2007 | Ramos et al. | 709/248 |
| 2007/0156436 A1 | 7/2007 | Fisher et al. | 705/1 |
| 2007/0165863 A1 | 7/2007 | Moosavi | 380/283 |

(Continued)

FOREIGN PATENT DOCUMENTS

| JP | 2009 230410 | 10/2008 |
|---|---|---|
| WO | 2007/112787 | 11/2007 |

(Continued)

OTHER PUBLICATIONS

U.S. Appl. No. 12/565,912, filed Feb. 24, 2009, Griffin et al.

(Continued)

*Primary Examiner* — Melody Mehrpour
(74) *Attorney, Agent, or Firm* — Allen, Dyer, Doppelt, Milbrath & Gilchrist, P.A.

(57) ABSTRACT

A mobile wireless communications device may include wireless transceiver circuitry and a processor coupled to the wireless transceiver circuitry. The mobile wireless communication device may also include a near-field communication (NFC) device coupled to the processor. The NFC device may include an NFC controller, an NFC transceiver coupled to the NFC controller, and a first memory coupled to the NFC controller and configured to store a first plurality of applications. The mobile wireless communications device may also include a second memory configured to store a second plurality of applications. The processor may be configured to select a given application on a respective one of the first and second memories and to disable the other one of the first and second memories.

26 Claims, 4 Drawing Sheets

(56) References Cited

U.S. PATENT DOCUMENTS

| | | | |
|---|---|---|---|
| 2007/0176903 A1 | 8/2007 | Dahlin et al. | |
| 2007/0197261 A1 | 8/2007 | Humbel | 455/558 |
| 2007/0266131 A1 | 11/2007 | Mazur et al. | 709/223 |
| 2008/0011833 A1 | 1/2008 | Saarisalo | |
| 2008/0012706 A1 | 1/2008 | Mak-Fan et al. | 340/568.1 |
| 2008/0014989 A1 | 1/2008 | Sandegard et al. | 455/557 |
| 2008/0191892 A1 | 8/2008 | Kirkup et al. | 340/686.6 |
| 2009/0037326 A1 | 2/2009 | Chitti et al. | |
| 2009/0192937 A1 | 7/2009 | Griffin et al. | 705/42 |
| 2009/0312000 A1* | 12/2009 | Wakefield et al. | 455/418 |
| 2010/0009643 A1* | 1/2010 | Haartsen | 455/127.5 |
| 2010/0082445 A1 | 4/2010 | Hodge et al. | 705/21 |
| 2010/0082490 A1 | 4/2010 | Rosenblatt et al. | 705/64 |
| 2010/0084918 A1* | 4/2010 | Fells et al. | 307/32 |
| 2010/0217707 A1 | 8/2010 | Phillips | 705/41 |
| 2012/0040609 A1* | 2/2012 | Griffin et al. | 455/41.1 |
| 2012/0100867 A1* | 4/2012 | Liang et al. | 455/456.1 |

FOREIGN PATENT DOCUMENTS

| | | |
|---|---|---|
| WO | 2008/069829 | 6/2008 |
| WO | 2009/018255 | 2/2009 |
| WO | 2009/082126 | 7/2009 |
| WO | 2009/105115 | 8/2009 |

OTHER PUBLICATIONS

"NFC will make mobile payment and ticketing easier" NOKIA Press Backgrounder; Jun. 2006.

"GlobalPlatform's Proposition for NFC Mobile: Secure Element Management and Messaging" White Paper; Apr. 2009.

"GlobalPlafform's Mobile Task Force Requirements for NFC Mobile: Management of Multiple Secure Elements" Version 1.0; Public release; Feb. 2010.

U.S. Appl. No. 13/034,006, filed Feb. 24, 2011, Moosavi et al.

U.S. Appl. No. 12/955,066, filed Nov. 29, 2010, DeLuca.

"Apple Introduces us to a NewiTunes Concert Ticket + System" http://www.patentlyapple.com/patently-apple/2010/04/apple-introduces-ustoanewitunes-concert-ticket-system.html Printed Mar. 17, 2011.

"UWave: Accelerometer-based Personalized Gesture Recognition and Its Applications" http://www.ruf.rice.edu/~mobile/publications/liu09percom.pdf Printed Mar. 17, 2011.

"Shake Well Before Use: Authentication Based on Ac celerometer Data" http://docs.google.com/viewer?a=v&q=cache:Ahpq2iXVLEJ:citeseerx.ist.psu.edu/viewdoc/dowload%3Fdoi%3D10.1.1.76.9793%26rep%3Drep1%26type%3Dpdf+accelerometer+movement+based+network+password+authentication&hl=en&gl=ca&pid=bl&srcid=ADGEESjB65kDWWzWTlfk8nYGIv3nX900-xrCJrzPXyFyj8ETR8b6Ygpx_XksofzM1eKvPw0ESNHbq7Sv2WFvTJzMd8KVfAbJFKiaTBQkp8VKy3sgtD4iEul9VrEen1LXFOhTuC2s1FIJ&sig=AHIEtbSjqJUZN_0V7fZawnia41PTiqldW Printed Mar. 17, 2011.

"Towards a Secure Internet of Things made of RFID/NFC" http://www.comics.unina.it/index.php?option=com_content&task=view&id=226&Itemid=1; Printed Jan. 28, 2011.

"Fonelabs launches range of low-cost NFC phones" http://www.nearfieldcommunicationsworld.com/2009/03/12/3856/fonelabs-launches-range-of-low-cost-nfcphones; Printed Jan. 28, 2011.

Bump Iphone Application: http://iphone.tmcnet.com/topics/iphone/articles/55072-bump-app-exchanging-contact-info-the-iphone-one.htm Nov. 23, 2010.

Mover Iphone App: http://infinite-labs.net/mover/ Nov. 23, 2010.

Jefferson et al. "*The Human Chain puts NFC form factors to the test in latest White Paper*" Aug. 28, 2009.

"*Apple Getting Serious About Near Field Communication on the iPhone*" http://www.patentlyapple.com Feb. 18, 2010: Printed Oct. 5, 2010.

"Flip n Shake light" http://uk.androlib.com/android.application.com-zosqlabs-androidflipshake-wBBB.aspx printed Feb. 22, 2010.

Rukzio et al. "*Exploring Expressive NFC-Based Mobile Phone Interaction with Large Dynamic Displays Near Field Communication, 2009.*" NFC '09. First International Workshop: Feb. 24, 2009 pp. 36-41 Abstract: Inherent obstacles (Abstract only).

Thoughts on Nokia's NFC developments *By Timo* \ Published: May 7, 2008 Printed Feb. 22, 2011 http://www.nearfield.org/2008/05/thoughts-on-nokias-nfc-developments.

*Timo Arnell* Graphic language for touch Nov. 21, 2005 http://www.elasticspace.com/2005/11/graphic-language-for-touch.

Pering et al. "*Gesture Connect: Facilitating Tangible Interaction with a Flick of the Wrist*", 2007.

U.S. Appl. No. 13/074,423, filed Mar. 29, 2011, Adams et al.

U.S. Appl. No. 13/074,484, filed Mar. 29, 2011, Adams et al.

U.S. Appl. No. 13/074,471, filed Mar. 29, 2011, Carbonell Duque et al.

U.S. Appl. No. 13/074,450, filed Mar. 29, 2011, Walker et al.

Nokia 6131 NFC User Guide http://nds1.nokia.com/phones/files/guides/Nokia_6131_NFC_UG_en.pdf, 2008, pp. 1-116.

Kirovski et al. "The Martini Synch: Using Accelerometers for Device Pairing" Microsoft Research, Jun. 2007, pp. 1-16.

Bailly et al. "White Paper: Breakthroughs in the European Mobile Payment Market" Atos Origin, 2007, pp. 1-16.

"Dynamic management of multi-application secure elements" StoLPaN-NVC mobile services standards consortium, Aug. 11, 2008, pp. 1-20.

\* cited by examiner

MOBILE WIRELESS COMMUNICATIONS DEVICE HAVING A NEAR FIELD COMMUNICATION (NFC) DEVICE AND PROVIDING MEMORY DISABLING AND RELATED

TECHNICAL FIELD

This application relates to the field of communications, and more particularly, to wireless communications systems and related methods.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile wireless communications devices. This short-range high frequency wireless communications technology exchanges data between devices over a short distance, such as only a few centimeters.

DETAILED DESCRIPTION

Figure 1:
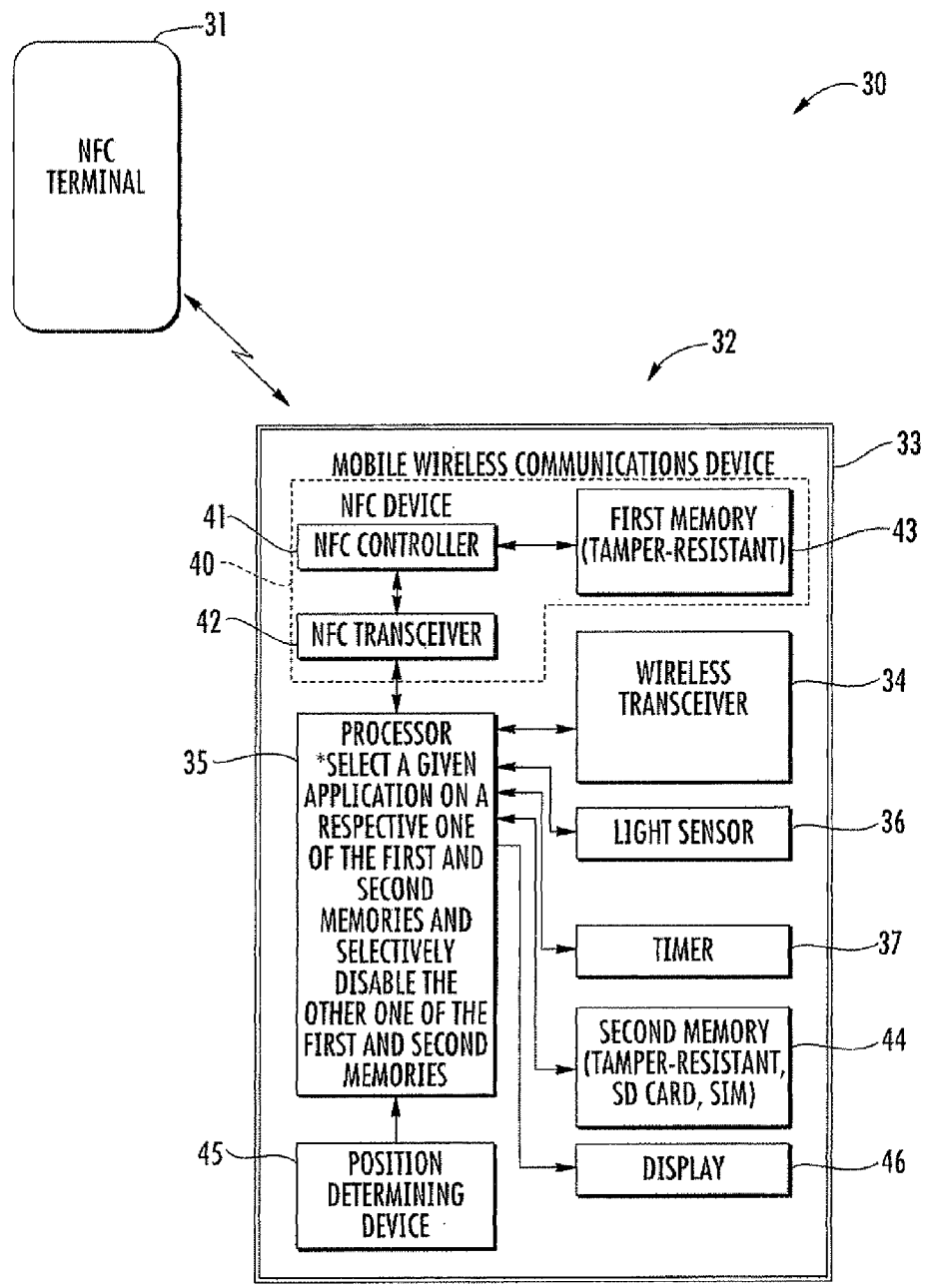
FIG. 1 is a schematic block diagram of a communications system in accordance with an example embodiment.

The present description is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Generally speaking, a mobile wireless communications device is disclosed herein which may include a wireless transceiver and a processor coupled with the wireless transceiver circuitry. The mobile wireless communication device may also include a near-field communication (NFC) device coupled with the processor, for example. The NFC device may include a NFC controller, a NFC transceiver coupled with the NFC controller, and a first memory coupled with the NFC controller and capable of storing a first plurality of applications. The mobile wireless communications device may also include a second memory capable of storing a second application, for example. The processor may be configured to select one of the first applications and the second application (e.g., a given application) on a respective one of the first memory and the second memory and to disable the other one of the first memory and the second memory.

The NFC transceiver may be configured to operate using a first NFC communications protocol based upon NFC communications. The processor may be configured to select the given application based upon a match with the first communications protocol, for example.

The mobile wireless communications device may further include a position determining device coupled with the processor which may be configured to determine a geographic location. The processor may be configured to select the given application based upon the geographic location.

The mobile wireless communications device may further include a light sensor coupled with the processor and may be configured to determine a light level. The processor may be configured to select the given application based upon the light level, for example.

The mobile wireless communications device may further include a timer coupled with the processor and may be configured to determine a time. The processor may be configured to select the given application based upon the time, for example.

At least one of the first memory and the second memory may comprise a secure element.

The second memory may be removably coupled to the processor. At least one of the first application and the second application may comprise a financial payment application. At least one of the first application and the second application may also include a secure access application, for example. The second memory may include one of a secure digital memory card or a subscriber identity module, for example.

A related communications system and a method are also provided. The method aspect is directed to a communications method for a mobile wireless communications device that may include wireless transceiver circuitry, a processor coupled with the wireless transceiver circuitry, and a near-field communication (NFC) device coupled with the processor. The NFC device may include a NFC controller, a NFC transceiver coupled with the NFC controller, and a first memory coupled with the NFC controller and capable of storing a first plurality of applications. The mobile wireless communications device may also include a second memory capable of storing a second plurality of applications, for example. The method may include using the processor to select one of the first application and the second application (e.g., a given application) on a respective one of the first memory and the second memory. The method may also include using the processor to disable the other one of the first memory and the second memory, for example.

A related computer-readable medium aspect is directed to a non-transitory computer-readable medium for use with a mobile wireless communications device, such as the one described briefly above. The non-transitory computer-readable medium may have computer-executable instructions for causing the mobile wireless communications device to perform various steps. The steps may include selecting one of the first applications and the second application (e.g., a given application) on a respective one of the first memory and the second memory, and disabling the other one of the first memory and the second memory.

Figure 2:
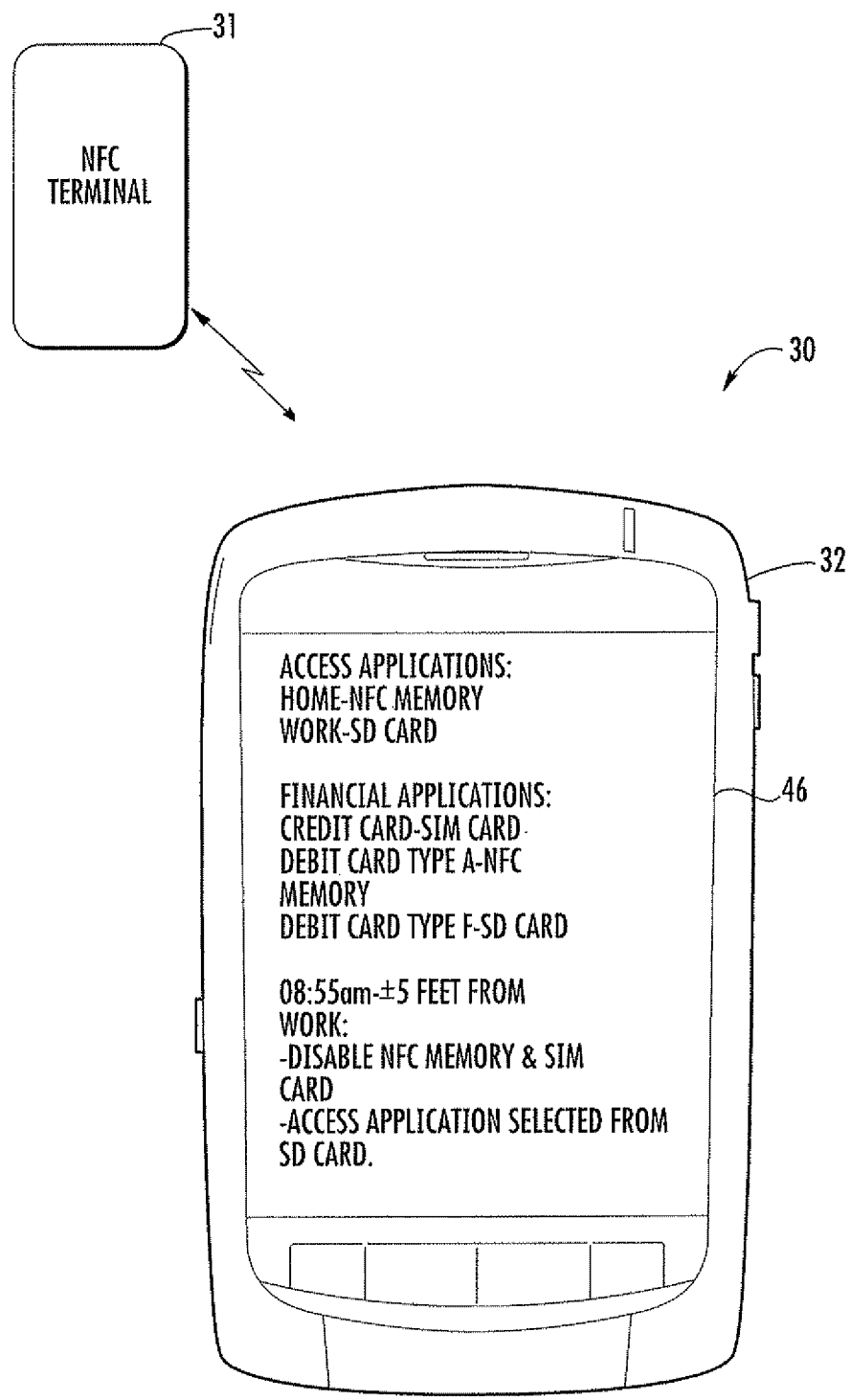
FIG. 2 is a schematic diagram of the communications system of FIG. 1 showing the display of the mobile device.

Referring initially to FIGS. 1-2, a communications system 30 illustratively includes a near field communication (NFC) terminal 31 associated with an object, and a mobile wireless communications device 32 (also referred to as a "mobile device" herein). Example mobile wireless communications devices may include portable or personal media players (e.g., music or MP3 players, video players, etc.), portable gaming devices, portable or mobile telephones, smartphones, tablet computers, digital cameras, etc.

The mobile device 32 illustratively includes a portable housing 33 and a wireless transceiver 34 carried by the portable housing 33. The wireless transceiver 34 may comprise a cellular transceiver or other type of wireless communications transceiver, and may communicate any combination of voice and data, such as, for example, email.

The mobile device 32 includes a display 46 carried by the portable housing 33. The display 46 may comprise a liquid crystal display (LCD) and may be configured to display information relating to data or voice communications. The display 46 may be in the form of an active display that includes a backlight, for example. The display 46 may display email information, contact information, or call information. The display 46 may be another type of display, for example, a passive display, and may display other information.

The mobile device 32 also includes a processor 35 that is carried by the portable housing 33 and coupled with the wireless transceiver circuitry 34 and the display 46. The processor 35 may be implemented using hardware (e.g., memory, etc.) and software components, i.e., computer-readable instructions for causing the mobile device 32 to perform the various functions or operations described herein.

The mobile device 32 also includes a NFC device 40 carried by the portable housing and coupled with the processor 35. The NFC device 40 includes a NFC controller 41 and a NFC transceiver 42 coupled with the NFC controller 41. The NFC controller 41 and the NFC transceiver 42 advantageously cooperate to perform at least one NFC communication function. For example, the NFC device 40 may communicate with the NFC terminal 31 based upon proximity thereto using NFC communication. The NFC terminal 31 may be a NFC tag, a NFC-enabled mobile device, a smart poster etc.

By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of about 10 cm, but other suitable versions of near-field communication which may have different operating frequencies, effective ranges, etc., for example, may also be used.

The NFC device 40 also includes a first memory 43 coupled to the NFC controller 41. More particularly, the first memory 43 may be embedded within the NFC device hardware or within the NFC integrated circuit (IC). The first memory 43 may be tamper resistant, for example. In other words, the first memory 43 may comprise a secure element. The first memory 43 or secure element, may store applications relating to NFC communications, or contactless applications for communicating with the NFC terminal 31. For example, the applications may include financial payment applications, secure access system applications, loyalty card applications, and other applications, and may be encrypted. In some example embodiments, the first memory 43 may store only one application.

The mobile device 32 also includes a second memory 44. The second memory 44 may also be tamper resistant, for example. In other words, the second memory 44 may also be configured to be a "secure element." The second memory 44 or secure element, may store a second set of applications also relating to NFC communications, or contactless applications for communicating with the NFC terminal 31. For example, the second set of applications may also include financial payment applications, secure access system applications, loyalty card applications, and other applications, and may also be encrypted. In some example embodiments, the second memory 44 may store only one application. The second memory 44 may be part of the universal integrated circuit card (UICC), for example. The second memory 44 may also be removable, and may be a secure-digital (SD) card or a subscriber identity module (SIM) card, for example. The second memory 44 may be another type of memory. Of course, while first and second memories 43, 44 are described herein, more than two memories may be used. In other words, applications, or secure elements, may be stored in or spread over various memory devices. It should also be noted that a secure element may be implemented in a dedicated or secure area of a common memory, for example.

The processor 35 may be configured to select a given application on a respective one of the first and second memories 43, 44 based upon the context of the use or one or more sensors, for example. The processor 35 may also disable the other one of the first and second memories 43, 44 after selecting the given application.

The mobile device 32 may also illustratively include a position determining device 45 coupled to the processor 35, the position determining device 45 can be configured to determine a geographic position of the mobile wireless communications device 32. The position determining device 45 may comprise a global position system (GPS) device, for example. The position determining device 45 may comprise another type of position determining device. The processor 35 may be configured to select the given application based upon the geographic position or location.

By way of example, the position determining device 45 may cooperate with the processor 35 to determine whether the mobile device 32 is within the proximity, or within a threshold area, of the NFC terminal 31 that may control a secure area or door, for example, of a building, etc. Based thereon, the processor 35 may advantageously select the (secure element) application that cooperates with the NFC transceiver 42 to provide access to the building, or unlock the door. The application is selected from the appropriate memory that is storing it. The other memory, or memories, may be disabled. This advantageously increases processing speed, for example, as less cycles through the memory may be needed to select an appropriate application to communicate with the NFC terminal 31. Power consumption may also be reduced as a result. Another advantage is that this may help reduce conflicts between different secure elements attempting to all initially communicate with the NFC terminal.

In another example, the position determining device 45 may cooperate with the processor 35 to determine that the mobile device 32 is outside its "home country." The processor 35 may select a financial payment application designated as a foreign payment application, versus a domestic payment application, or even a default payment application, and disable the memory having the domestic and default financial payment applications stored thereon. More than one financial payment application may be used in more than one determined geographic location.

In one advantageous example embodiment, a table or list of corresponding applications, for example, financial payment applications, and geographic locations may be stored in a memory. The table may be stored in either one of the first and second memories 43, 44, or another memory (not shown), such as, for example, the device memory. The position determining device 45 may cooperate with the processor 35 to read from the table and select the corresponding application. For example, one application may be selected for a first type of service or goods, for example, a grocery store, a second application for a second type of store, for example, a gas station, and so forth. Many different categories of applications may be set to correspond to any number of applications and geographic locations. The table may include other types of data. The memory or memories not having the selected given application may be disabled.

In some example embodiments, the mobile device 32 includes a light sensor 36 coupled to the processor 35, the light sensor 36 may be configured to determine a light level. The processor 35 may be configured to select the given application based upon the light level.

For example, the light sensor 36 may cooperate with the processor 35 to determine whether it is dark outside. Based upon the darkness, the processor 35 may select the application that may cooperate with the NFC transceiver 42 to control a secure area or door, for example, of a bank automated teller machine (ATM) access door. The processor 35 advantageously selects the (secure element) application that cooperates with the NFC transceiver 42 to provide access to the ATM, or unlock the door. The application is selected from the appropriate memory. The other memory, or memories, not having the selected application may be disabled. The processor 35 may cooperate with the light sensor 36 to select a given application based upon other sensed light conditions, for example, whether the light level is above a threshold level. Indeed, the light sensor 36 may be used in conjunction with the position determining device 45 so that the processor 35 selects the given application based upon both the light level and the geographic position.

In some example embodiments, the mobile device 32 includes a timer or clock 37 coupled to the processor, the timer 37 may be configured to determine a time. The processor 35 may be additionally or alternatively configured to select the given application based upon the time.

For example, the timer 37 may cooperate with the processor 35 to determine the time of day. Based upon the time of day, the processor 35 may select the application that may cooperate with the NFC transceiver 42 to control a secure area or door, for example. More particularly, the processor 35 may select, from one of the first and second memories 43, 44, the application that cooperates with the NFC transceiver 42 to provide access to an office building (work) between the hours of 8 a.m. and 9 a.m. (FIG. 2) and to provide access to a home between the hours of 4 p.m. and 6 p.m. The application is selected from the appropriate memory. The other memory, or memories, for example, the NFC memory and a SIM card memory (not shown), not having the selected application may be disabled. In some example embodiments, the timer 37 may be used in conjunction with one or more of the position determining device 45 and the light sensor 36 so that the processor 35 selects the given application based upon one or more of the time, the light level and, the geographic position. Other sensors or input devices may be used and may cooperate with the processor 35 to select the given application. In accordance with another example aspect, a satellite position determining device (e.g., GPS, etc.) may be used to determine proximity to a restaurant, store, etc., and this can trigger selection of an appropriate memory or secure element (e.g., for coupons or rewards points to be redeemed, etc.).

In contrast to prior approaches where management of the applications was performed manually over the air or via a user interface, the processor 35 cooperates with one or more of the position determining device 45, the timer 37, the light sensor 36, and any other sensors to predict which application will be used next. The application may be selected based thereon and the memory or memories not having the given selected application stored thereon may be disabled. In other words, management of the applications may be limited to an initial set up. Moreover, the application selected by the processor 35 along with a listing of available applications may be displayed on the display 46 (FIG. 2). This information may not be displayed in some embodiments.

In yet another advantageous example embodiment, the NFC transceiver 42 may be configured to operate using a first NFC communications protocol based upon NFC communications, for example, with the NFC terminal 31. Each application has a respective NFC communications protocol associated therewith. For example, the NFC transceiver 42 may be configured to communicate with the NFC terminal 31 via the NFC type "A," protocol and the first memory 43 (NFC memory) may have an application stored thereon configured to operate via the NFC type "B" protocol, while the second memory 44 may have applications stored thereon configured to operate via the NFC type "F" and the NFC type "A" protocols. The processor 35 is configured to advantageously select the given application based upon a match with the first communications protocol.

In other words, in the above example, the processor 35 may select the application configured to operate via the NFC type "A" protocol stored on the second memory 44, and the processor is configured to disable the first memory 43. Of course, the applications may be task specific applications, for example, financial applications, and may be stored in one or both of the first and second memories 43, 44 or additional memories. Indeed, selecting the given application based upon a match with the first NFC protocol may advantageously increase processing speed by reducing the number of cycles. More particularly, the processor 35 may not have to search all the memories or cooperate with the applications to find out which applications may not be compatible with the NFC terminal 31.

Figure 3:
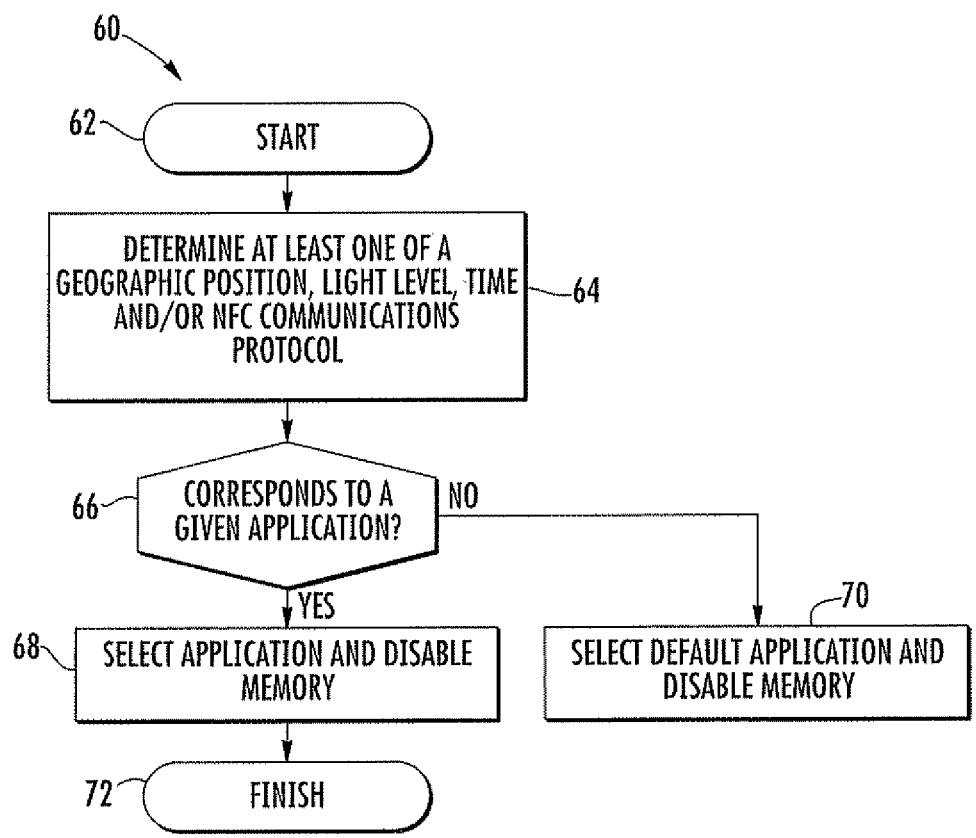
FIG. 3 is a flow diagram illustrating example method aspects associated with the system and devices of FIGS. 1-2.

Referring now to the flowchart 60 of FIG. 3, related method aspects are now described. Beginning at Block 62, the processor 35 cooperates with at least one of the position determining device 45, the light sensor 36, and the timer 37 to determine at least one of a geographic position, a light level, and a time, respectively (Block 64). A first NFC protocol is determined by operation of the NFC transceiver 42 with the NFC terminal 31 also at Block 64. At Block 66, the processor 35 determines whether one or more of the geographic position, light level, time, and NFC protocol correspond to a given application (secure element) (i.e., which secure element is appropriate given the current geographic position, light level, time, or NFC protocol being used). If there is a match between an application stored on one of first and second memories 43, 44, the processor 35, at Block 68, selects the application and disables the memory not storing the application. If there is no match between an application stored on one of first and second memories 43, 44, the processor 35, at Block 70, selects the default application and disables the memory not storing the default application. The method ends at Block 72.

Example components of a mobile wireless communications device 1000 that may be used in accordance with the above-described embodiments are further described below with reference to FIG. 4. The device 1000 illustratively includes a housing 1200, a keyboard or keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 4:
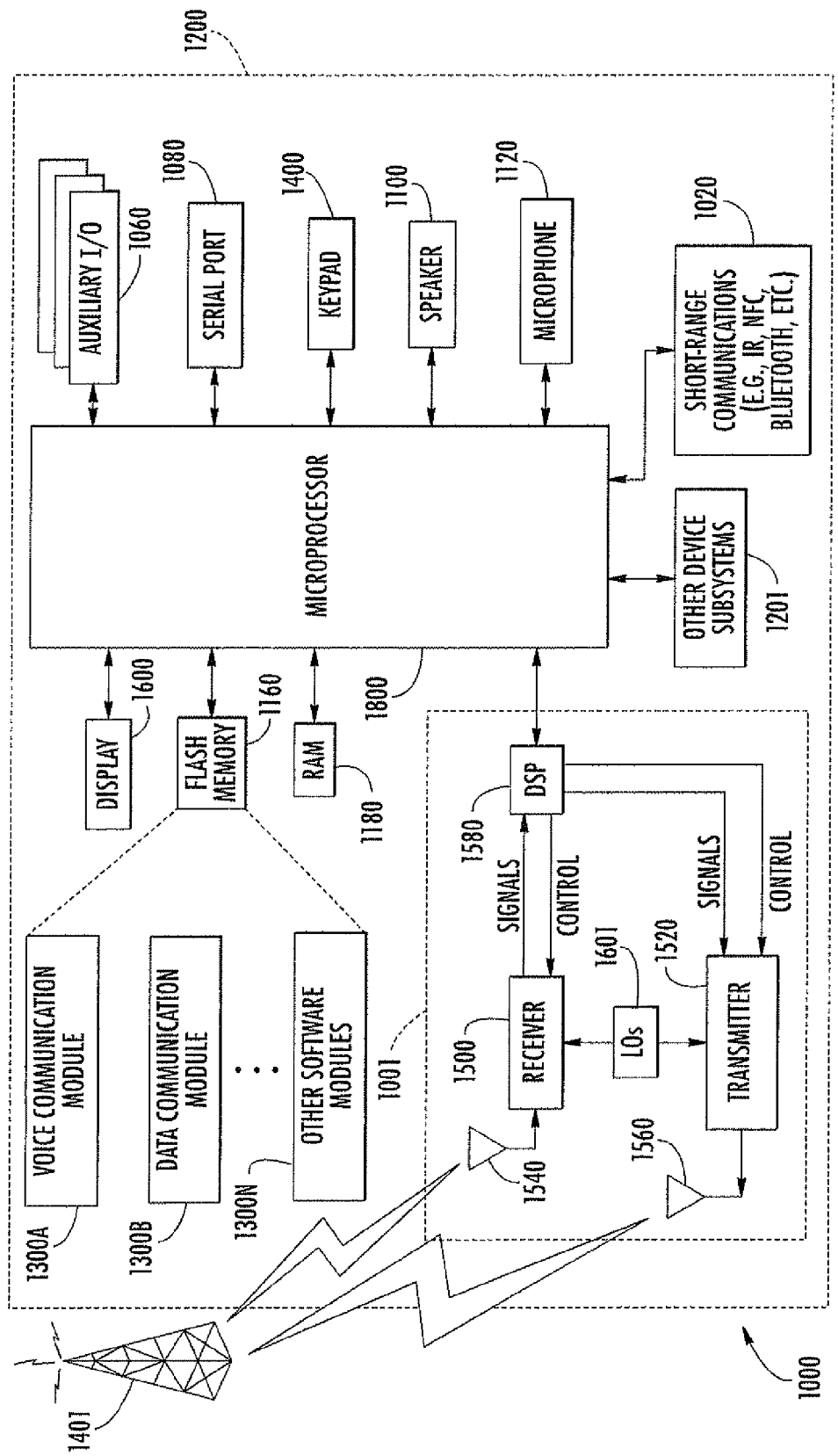
FIG. 4 is a schematic block diagram illustrating example mobile wireless communications device components that may be used with the devices of FIGS. 1 and 2.

In addition to the processing device 1800, other parts of the mobile device 1000 are shown schematically in FIG. 4. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a near field communications (NFC) sensor for communicating with a NFC device or NFC tag via NFC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A mobile wireless communications device comprising:
    a wireless transceiver;
    a processor coupled with said wireless transceiver;
    a near-field communication (NFC) device coupled with said processor, the NFC device comprising
        a NFC controller,
        a NFC transceiver coupled with said NFC controller, and a first memory coupled with said NFC controller, the first memory being capable of storing a first application; and a second memory capable of storing a second application;

said processor being configured to select one of the first application and the second application on a respective one of the first memory and the second memory and to disable the other one of the first memory and the second memory.

2. The mobile wireless communications device of claim 1, wherein the NFC transceiver is configured to operate using a first NFC communications protocol; and wherein the processor is configured to select one of the first application and the second application based upon a match with the first NFC communications protocol.

3. The mobile wireless communications device of claim 1 further comprising a position determining device coupled with said processor, the position determining device being configured to determine a geographic location of the mobile wireless communications device; and wherein said processor is configured to select one of the first application and the second application based upon the geographic location.

4. The mobile wireless communications device of claim 1 further comprising a light sensor coupled with said processor, the light sensor being configured to determine a light level; and wherein said processor is configured to select one of the first application and the second application based upon the light level.

5. The mobile wireless communications device of claim 1 further comprising a timer coupled with said processor, the timer being configured to determine a time; and wherein said processor is configured to select one of the first application and the second application based upon the time.

6. The mobile wireless communications device of claim 1 wherein at least one of the first memory and the second memory comprises a secure element.

7. The mobile wireless communications device of claim 1 wherein said second memory is removably coupled with said processor.

8. The mobile wireless communications device of claim 1 wherein at least one of the first application and the second application comprises a financial payment application.

9. The mobile wireless communications device of claim 1 wherein at least one of the first application and the second application comprises a secure access application.

10. The mobile wireless communications device of claim 1 wherein said second memory comprises one of a secure digital memory card and a subscriber identity module.

11. A communications system comprising:

a near-field communication (NFC) terminal; and a mobile wireless communications device configured to communicate with said NFC terminal and comprising
a wireless transceiver,
a processor coupled with said wireless transceiver,
a near-field communication (NFC) device coupled to said processor, said NFC device comprising
a NFC controller,
a NFC transceiver coupled to said NFC controller, and
a first memory coupled with said NFC controller and capable of storing a first plurality of applications for communicating with said NFC terminal, and
a second memory capable of storing a second application for communicating with said NFC terminal,
said processor being configured to select one of the first applications and the second application on a respective one of said first and second memories and to disable the other one of the first memory and the second memory.

12. The communications system of claim 11 wherein said NFC transceiver is configured to operate using a first NFC communications protocol based upon said NFC terminal; and wherein said processor is configured to select one of the first applications and the second application based upon a match with the first communications protocol.

13. The communications system of claim 11 wherein said mobile wireless communications device further comprises a position determining device coupled with said processor, the position determining device configured to determine a geographic location of the mobile wireless communications device; and wherein said processor is configured to select one of the first applications and the second application based upon the geographic location.

14. The communications system of claim 11 wherein said mobile wireless communications device further comprises a light sensor coupled with said processor, the light sensor being configured to determine a light level; and wherein said processor is configured to select one of the first applications and the second application based upon the light level.

15. The communications system of claim 11 wherein said mobile wireless communications device further comprises a timer coupled with said processor, the timer being configured to determine a time; and wherein said processor is configured to select one of the first applications and the second application based upon the time.

16. The communications system of claim 11 wherein at least one of the first memory and the second memory comprises a secure element.

17. A communications method for a mobile wireless communications device comprising a wireless transceiver, a processor coupled with the wireless transceiver, a near-field communication (NFC) device coupled with the processor and comprising a NFC controller, a NFC transceiver coupled with the NFC controller, and a first memory coupled with the NFC controller and capable of storing a first plurality of applications, the mobile wireless communications device also comprising a second memory capable of storing a second application, the method comprising:

using the processor to select one of the first applications and the second application on a respective one of the first memory and the second memory; and using the processor to disable the other one of the first memory and the second memory.

18. The method of claim 17 further comprising operating the NFC transceiver using a first NFC communications protocol based upon NFC communications; and using the processor to select one of the first applications and the second application based upon a match with the first NFC communications protocol.

19. The method of claim 17 further comprising determining a geographic position based upon a position determining device coupled with the processor and selecting one of the first applications and the second application based upon the geographic location.

20. The method of claim 17 further comprising determining a light level based upon a light sensor coupled with the processor and selecting one of the first applications and the second application based upon the light level.

21. The method of claim 17 further comprising determining a time based upon a timer coupled with the processor and selecting one of the first applications and the second application based upon the time.

22. A non-transitory computer-readable medium for use with a mobile wireless communications device comprising a wireless transceiver, a processor coupled with the wireless transceiver circuitry, a near-field communication (NFC)

device coupled with the processor and comprising a NFC controller, a NFC transceiver coupled with the NFC controller, and a first memory coupled with the NFC controller and capable of storing a first plurality of applications, the mobile wireless communications device also comprising a second memory capable of storing a second application, the non-transitory computer-readable medium having computer-executable instructions for causing the mobile wireless communications device to perform steps comprising:

selecting one of the first applications and the second application on a respective one of the first memory and the second memory; and disabling the other one of the first memory and the second memory.

23. The non-transitory computer-readable medium of claim 22 wherein the NFC transceiver is configured to operate using a first NFC communications protocol based upon NFC communications; and wherein the computer-executable instructions are for causing the mobile wireless communications device to perform the step of selecting one of the first applications and the second application based upon a match with the first NFC communications protocol.

24. The non-transitory computer-readable medium of claim 22 further comprising a position determining device coupled with the processor and configured to determine a geographic position; and wherein the computer-executable instructions are for causing the mobile wireless communications device to perform the step of selecting one of the first applications and the second application based upon the geographic location.

25. The non-transitory computer-readable medium of claim 22 further comprising a light sensor coupled with the processor and configured to determine light level; and wherein the computer-executable instructions are for causing the mobile wireless communications device to perform the step of selecting one of the first applications and the second application based upon the light level.

26. The non-transitory computer-readable medium of claim 22 further comprising a timer coupled with the processor and configured to determine a time; and wherein the computer-executable instructions are for causing the mobile wireless communications device to perform the step of selecting one of the first applications and the second application based upon the time.

\* \* \* \* \*